(12) United States Patent
Kwon et al.

(10) Patent No.: US 11,745,291 B2
(45) Date of Patent: Sep. 5, 2023

(54) APPARATUS AND METHOD FOR PROCESSING SUBSTRATE

(71) Applicant: SEMES CO., LTD., Chungcheongnam-do (KR)

(72) Inventors: Ohyeol Kwon, Chungcheongnam-do (KR); Jun Keon Ahn, Sejong-si (KR); Byungsun Bang, Gyeonggi-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 390 days.

(21) Appl. No.: 16/862,086

(22) Filed: Apr. 29, 2020

(65) Prior Publication Data

US 2020/0346304 A1   Nov. 5, 2020

(30) Foreign Application Priority Data

Apr. 30, 2019   (KR) .................. 10-2019-0050340

(51) Int. Cl.
*B23K 26/362*   (2014.01)
*G02B 27/14*   (2006.01)
(Continued)

(52) U.S. Cl.
CPC ........ *B23K 26/362* (2013.01); *B23K 26/0604* (2013.01); *B23K 26/0622* (2015.10);
(Continued)

(58) Field of Classification Search
CPC .... B23K 26/103; B23K 26/00; B23K 26/402; B23K 26/57; B23K 26/36; B23K 26/0619;
(Continued)

(56) References Cited

U.S. PATENT DOCUMENTS 9,976,939 B2 * 5/2018 Hall ....................... G06T 17/00
2011/0000898 A1   1/2011 Rumsby
(Continued)

FOREIGN PATENT DOCUMENTS

CN   1550283 A   12/2004
CN   101977722 A   2/2011
(Continued)

OTHER PUBLICATIONS

Office Action for related Korean Patent Application No. 10-2019-0050340 dated Jul. 8, 2020 (4 pages).

*Primary Examiner* — Nathaniel E Wiehe
*Assistant Examiner* — Spencer H. Kirkwood
(74) *Attorney, Agent, or Firm* — Procopio, Cory, Hargreaves & Savitch LLP (57) ABSTRACT

An apparatus includes a support unit supporting a substrate including a film, a laser generation unit that generates a laser beam to process the film, a beam splitter that splits the laser beam into a first laser beam travelling along a first path toward an upper edge of the substrate and a second laser beam travelling along a second path toward a lower edge of the substrate, a first beam shaping unit on the first path shaping the first laser beam, a second beam shaping unit on the second path shaping the second laser beam, a first beam scanning unit downstream of the first beam shaping unit that applies the first laser beam to the upper edge in the manner of scanning, and a second beam scanning unit downstream of the second beam shaping unit that applies the second laser beam to the lower edge in the manner of scanning.

8 Claims, 5 Drawing Sheets

(51) Int. Cl.
  *G02B 27/09*    (2006.01)
  *G02B 26/10*    (2006.01)
  *B23K 26/06*    (2014.01)
  *B23K 26/082*   (2014.01)
  *B23K 26/402*   (2014.01)
  *B23K 26/0622*  (2014.01)
  *B23K 103/00*   (2006.01)

(52) U.S. Cl.
  CPC ........ *B23K 26/0626* (2013.01); *B23K 26/082* (2015.10); *B23K 26/402* (2013.01); *G02B 26/10* (2013.01); *G02B 27/09* (2013.01); *G02B 27/14* (2013.01); *B23K 2103/42* (2018.08); *B23K 2103/54* (2018.08)

(58) Field of Classification Search
  CPC ............ B23K 26/0622; B23K 26/0676; B23K 26/0823; B23K 26/142; B23K 26/16; B23K 26/361; B23K 26/40; B23K 26/362; G02B 26/10; G02B 27/09; G02B 27/14

USPC ...................................................... 425/174.4
  See application file for complete search history.

(56) References Cited

U.S. PATENT DOCUMENTS

| 2011/0139759 A1* | 6/2011 | Millman, Jr. ...... B23K 26/0823 |
| | | 219/121.72 |
| 2011/0147352 A1 | 6/2011 | Harte et al. |
| 2011/0168672 A1 | 7/2011 | Harte et al. |
| 2015/0370374 A1 | 12/2015 | Chan |
| 2017/0247797 A1* | 8/2017 | Zhou ...................... F01D 5/005 |

FOREIGN PATENT DOCUMENTS

| CN | 106794549 A    | 5/2017  |
| JP | 2008264854 A   | 11/2008 |
| JP | 2010534140 A   | 11/2010 |
| JP | 2014504004 A   | 2/2014  |
| JP | 2016115893 A   | 6/2016  |
| KR | 1020110025109 A | 3/2011 |
| WO | 2017/061706 A1 | 4/2017  |

\* cited by examiner

APPARATUS AND METHOD FOR PROCESSING SUBSTRATE

CROSS-REFERENCE TO RELATED APPLICATIONS

A claim for priority under 35 U.S.C. § 119 is made to Korean Patent Application No. 10-2019-0050340 filed on Apr. 30, 2019, in the Korean Intellectual Property Office, the entire contents of which are hereby incorporated by reference.

BACKGROUND

Embodiments of the inventive concept described herein relate to an apparatus and method for processing a substrate.

Various processes, such as coating, photolithography, deposition, ashing, etching, ion implantation, and the like, are performed to process a substrate, for example, a semiconductor wafer or a glass panel used to manufacture a flat panel display. As the processes are performed on the substrate, the substrate has a solidified thin film applied to or deposited on the surface of the substrate. An edge bead removal process is required to raise production yield at an edge of the substrate. In the edge bead removal process, an unwanted thin film and an attached by-product polymer are removed from the edge region of the substrate.

Figure 1:
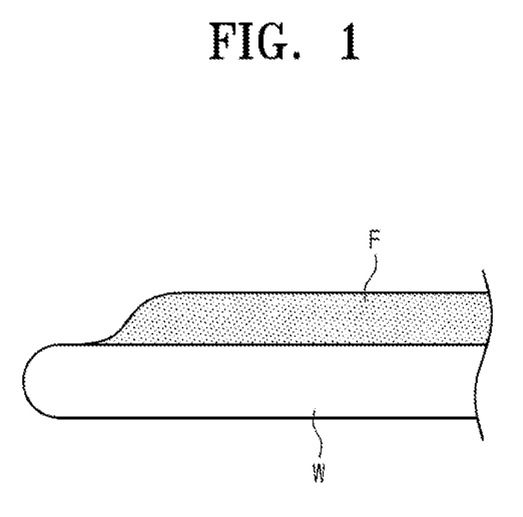
FIG. 1 is a view illustrating a section after removal of an edge bead by a chemical.

In general, a substrate processing apparatus removes an edge bead by dispensing a chemical onto an edge region of a substrate W. In the case of performing the edge bead removal process using the chemical, removal of a film from the edge region of the substrate W may not be appropriately performed. For example, as illustrated in FIG. 1, a film F on an edge region of a substrate W may be removed so as to be downwardly inclined in the radial direction of the substrate W. When the edge bead is not appropriately removed, the yield of a manufacturing process falls. Furthermore, a pin mark may be formed on the surface of the substrate W after the process, and accordingly the substrate W may be additionally contaminated.

SUMMARY

Embodiments of the inventive concept provide a substrate processing apparatus and method for improving substrate processing efficiency.

In addition, embodiments of the inventive concept provide a substrate processing apparatus and method for simultaneously and effectively processing upper and lower edges of a substrate even when film conditions of the upper and lower edges of the substrate differ from each other.

The technical problems to be solved by the inventive concept are not limited to the aforementioned problems, and any other technical problems not mentioned herein will be clearly understood from the following description by those skilled in the art to which the inventive concept pertains.

According to an exemplary embodiment, an apparatus for processing a substrate includes a support unit that supports the substrate including a film to be removed, a laser generation unit that generates a laser beam to process the film to be removed, a beam splitter that splits the laser beam emitted from the laser generation unit and guided to the beam splitter into a first laser beam travelling along a first path toward an upper edge of the substrate and a second laser beam travelling along a second path toward a lower edge of the substrate, a first beam shaping unit that is provided on the first path and that shapes the first laser beam, a second beam shaping unit that is provided on the second path and that shapes the second laser beam, a first beam scanning unit that is provided downstream of the first beam shaping unit on the first path and that applies the first laser beam to the upper edge of the substrate in the manner of scanning, and a second beam scanning unit that is provided downstream of the second beam shaping unit on the second path and that applies the second laser beam to the lower edge of the substrate in the manner of scanning. A beam shape of the first laser beam shaped by the first beam shaping unit differs from a beam shape of the second laser beam shaped by the second beam shaping unit.

In an embodiment, a film condition of the upper edge of the substrate may differ from a film condition of the lower edge of the substrate.

In an embodiment, the substrate may be simultaneously processed by the first laser beam and the second laser beam.

In an embodiment, the second laser beam shaped by the second beam shaping unit may have a larger cross-section than the first laser beam shaped by the first beam shaping unit.

In an embodiment, energy per unit area of the first laser beam shaped by the first beam shaping unit may be greater than energy per unit area of the second laser beam shaped by the second beam shaping unit.

In an embodiment, a film etching rate of the first laser beam shaped by the first beam shaping unit may be greater than a film etching rate of the second laser beam shaped by the second beam shaping unit.

In an embodiment, scanning speed of the first beam scanning unit may differ from scanning speed of the second beam scanning unit.

In an embodiment, scanning speed of the first beam scanning unit may be lower than scanning speed of the second beam scanning unit.

According to an exemplary embodiment, a method for processing an edge of a substrate includes loading the substrate including a film to be removed, generating a laser beam to process the film to be removed, splitting the laser beam into a first laser beam travelling along a first path and a second laser beam travelling along a second path, shaping the first laser beam into a first beam shape, shaping the second laser beam into a second beam shape, and processing an upper edge of the substrate by delivering the first laser beam shaped into the first beam shape to the upper edge of the substrate, and processing a lower edge of the substrate by delivering the second laser beam shaped into the second beam shape to the lower edge of the substrate. The first beam shape differs from the second beam shape.

In an embodiment, a film etching rate of the first laser beam having the first beam shape may be greater than a film etching rate of the second laser beam having the second beam shape, the second laser beam being shaped by the second beam shaping unit.

In an embodiment, processing of the upper edge of the substrate by the first laser beam and processing of the lower edge of the substrate by the second laser beam may be simultaneously performed.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, embodiments of the inventive concept will be described in detail with reference to the accompanying drawings such that those skilled in the art to which the inventive concept pertains can readily carry out the inventive concept. However, the inventive concept may be implemented in various different forms and is not limited to the embodiments described herein. Furthermore, in describing the embodiments of the inventive concept, detailed descriptions related to well-known functions or configurations will be omitted when they may make subject matters of the inventive concept unnecessarily obscure. In addition, components performing similar functions and operations are provided with identical reference numerals throughout the accompanying drawings.

The terms "include" and "comprise" in the specification are "open type" expressions just to say that the corresponding components exist and, unless specifically described to the contrary, do not exclude but may include additional components. Specifically, it should be understood that the terms "include", "comprise", and "have", when used herein, specify the presence of stated features, integers, steps, operations, components, and/or parts, but do not preclude the presence or addition of one or more other features, integers, steps, operations, components, parts, and/or groups thereof.

The terms of a singular form may include plural forms unless otherwise specified. Furthermore, in the drawings, the shapes and dimensions of components may be exaggerated for clarity of illustration.

Hereinafter, embodiments of the inventive concept will be described in detail with reference to FIGS. 2 to 6.

Figure 2:
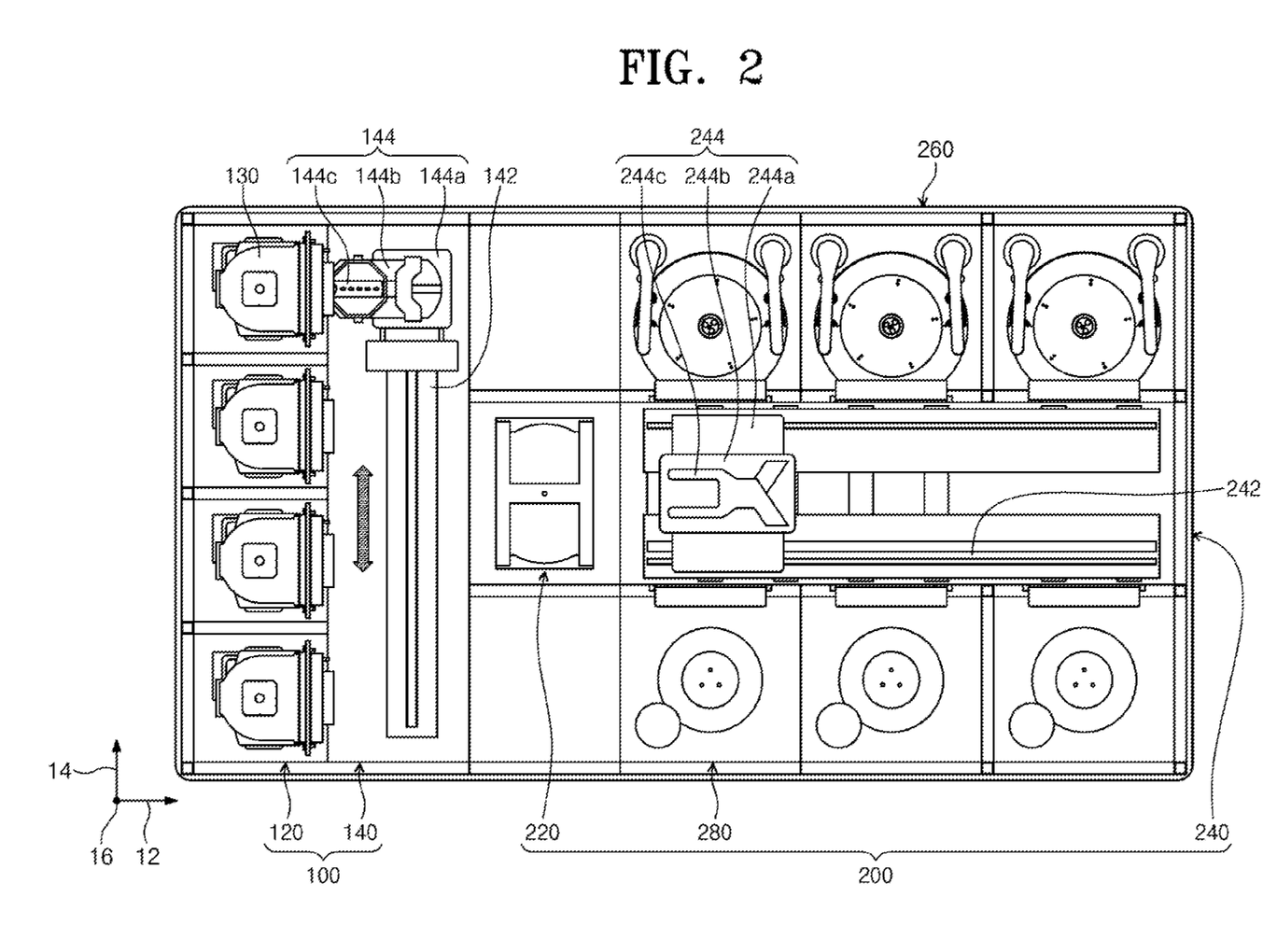
FIG. 2 is a plan view illustrating substrate processing equipment according to an embodiment of the inventive concept.

FIG. 2 is a plan view illustrating substrate processing equipment according to an embodiment of the inventive concept. Referring to FIG. 2, the substrate processing equipment 10 includes an index module 100 and a processing module 200. The index module 100 includes load ports 120 and a transfer frame 140. The load ports 120, the transfer frame 140, and the processing module 200 are sequentially arranged in a row. Hereinafter, the direction in which the load ports 120, the transfer frame 140, and the process module 200 are arranged is referred to as a first direction 12, a direction perpendicular to the first direction 12 when viewed from above is referred to as a second direction 14, and a direction perpendicular to the plane including the first direction 12 and the second direction 14 is referred to as a third direction 16.

Carriers 130, each of which has substrates W received therein, are seated on the load ports 120. The load ports 120 are disposed in a row along the second direction 14. The number of load ports 120 may be increased or decreased depending on process efficiency and footprint conditions of the processing module 200. Each of the carriers 130 has a plurality of slots (not illustrated) for receiving the substrates W in a horizontal position relative to the ground. A front opening unified pod (FOUP) may be used as the carrier 130.

The processing module 200 includes a buffer unit 220, a transfer chamber 240, liquid processing chambers 260, and laser processing chambers 280. The transfer chamber 240 is disposed such that the lengthwise direction thereof is parallel to the first direction 12. The liquid processing chambers 260 and the laser processing chambers 280 are disposed on opposite sides of the transfer chamber 240. The liquid processing chambers 260 and the laser processing chambers 280 are provided on one side and an opposite side of the transfer chamber 240 in a symmetric arrangement with respect to the transfer chamber 240. The liquid processing chambers 260 are provided on the one side of the transfer housing 240. Some of the liquid processing chambers 260 are disposed along the lengthwise direction of the transfer chamber 240. Furthermore, other liquid processing chambers 260 are stacked one above another. That is, the liquid processing chambers 260 may be disposed in an A×B array on the one side of the transfer chamber 240. Here, "A" denotes the number of liquid processing chambers 260 provided in a row along the first direction 12, and "B" denotes the number of liquid processing chambers 260 provided in a column along the third direction 16. When four or six liquid processing chambers 260 are provided on the one side of the transfer chamber 240, the liquid processing chambers 260 may be disposed in a 2×2 or 3×2 array. The number of liquid processing chambers 260 may be increased or decreased. Furthermore, similarly to the liquid processing chambers 260, the laser processing chambers 280 may be disposed on the opposite side of the transfer chamber 240. Unlike the above description, the liquid processing chambers 260 and the laser processing chambers 280 may be modified in various ways. For example, the liquid processing chambers 260 and the laser processing chambers 280 may be provided on only the one side of the transfer chamber 240. Alternatively, the liquid processing chambers 260 and the laser processing chambers 280 may be provided in a single layer on the opposite sides of the transfer chamber 240.

The buffer unit 220 is disposed between the transfer frame 140 and the transfer chamber 240. The buffer unit 220 provides a space in which the substrates W stay before transferred between the transfer chamber 240 and the transfer frame 140. The buffer unit 220 has slots (not illustrated) in which the substrates W are placed. The slots (not illustrated) are spaced apart from each other along the third direction 16. The buffer unit 220 is open at one side facing the transfer frame 140 and at an opposite side facing the transfer chamber 240.

The transfer frame 140 transfers the substrates W between the carriers 130 seated on the load ports 120 and the buffer unit 220. An index rail 142 and an index robot 144 are provided in the transfer frame 140. The index rail 142 is provided such that the lengthwise direction thereof is parallel to the second direction 14. The index robot 144 is installed on the index rail 142 and rectilinearly moves along the index rail 142 in the second direction 14. The index robot 144 includes a base 144a, a body 144b, and index arms 144c. The base 144a is installed so as to be movable along the index rail 142. The body 144b is coupled to the base 144a. The body 144b is movable on the base 144a along the third direction 16. Furthermore, the body 144b is rotatable on the base 144a. The index arms 144c are coupled to the body 144b and are movable forward and backward relative to the body 144b. The index arms 144c are individually operated. The index arms 144c are stacked one above another with a spacing gap therebetween along the third direction 16. Some of the index arms 144c may be used to transfer the substrates W from the processing module 200 to the carriers 130, and the other index arms 144c may be used to transfer the substrates W from the carriers 130 to the processing module 200. Accordingly, particles generated from the substrates W that are to be processed may be prevented from adhering to the processed substrates W in a process in which the index robot 144 transfers the substrates W between the carriers 130 and the processing module 200.

The transfer chamber 240 transfers the substrates W between the buffer unit 220 and the liquid processing chambers 260, between the buffer unit 220 and the laser processing chambers 280, between the liquid processing chambers 260, between the laser processing chambers 280, and between the liquid processing chambers 260 and the laser processing chambers 280. That is, the transfer chamber 240 is provided as a transfer unit that transfers the substrates W. A guide rail 242 and a main robot 244 are provided in the transfer chamber 240. The guide rail 242 is disposed such that the lengthwise direction thereof is parallel to the first direction 12. The main robot 244 is installed on the guide rail 242 and rectilinearly moves on the guide rail 242 along the first direction 12. The main robot 244 includes a base 244a, a body 244b, and main arms 244c. The base 244a is installed so as to be movable along the guide rail 242. The body 244b is coupled to the base 244a. The body 244b is movable on the base 244a along the third direction 16. Furthermore, the body 244b is rotatable on the base 244a. The main arms 244c are coupled to the body 244b and are movable forward and backward relative to the body 244b. The main arms 244c are individually operated. The main arms 244c are stacked one above another with a spacing gap therebetween along the third direction 16.

The liquid processing chambers 260 perform a process of processing a substrate W by dispensing processing liquids onto the substrate W. The processing liquids may include a chemical, a rinsing solution, and an organic solvent. The chemical may be a liquid having the property of acid or base. The chemical may include sulfuric acid ($H_2SO_4$), phosphoric acid ($P_2O_5$), hydrofluoric acid (HF), and ammonium hydroxide ($NH_4OH$). The chemical may be a diluted sulfuric acid peroxide (DSP) mixture. The rinsing solution may be deionized water ($H_2O$). The organic solvent may be isopropyl alcohol (IPA).

The liquid processing chambers 260 may perform cleaning processes. Substrate processing apparatuses provided in the liquid processing chambers 260 may have different structures depending on the types of cleaning processes. Alternatively, the substrate processing apparatuses provided in the liquid processing chambers 260 may have the same structure. Selectively, the liquid processing chambers 260 may be divided into a plurality of groups. Substrate processing apparatuses in the liquid processing chambers 260 belonging to the same group may have the same structure, and substrate processing apparatuses in the liquid processing chambers 260 belonging to different groups may have different structures. Furthermore, the liquid processing chambers 260 may perform various processes such as photolithography, ashing, etching, and the like.

The laser processing chambers 280 may perform a process of processing a substrate W by applying a laser beam to the substrate W. The laser processing chambers 280 may include a substrate processing apparatus 300. The substrate processing apparatus 300 may apply a laser beam to the substrate W. The substrate processing apparatus 300 may apply a laser beam to an edge region of the substrate W. The substrate processing apparatus 300 may perform a process of removing a film on the substrate W by applying a laser beam to the edge region of the substrate W.

Figure 3:
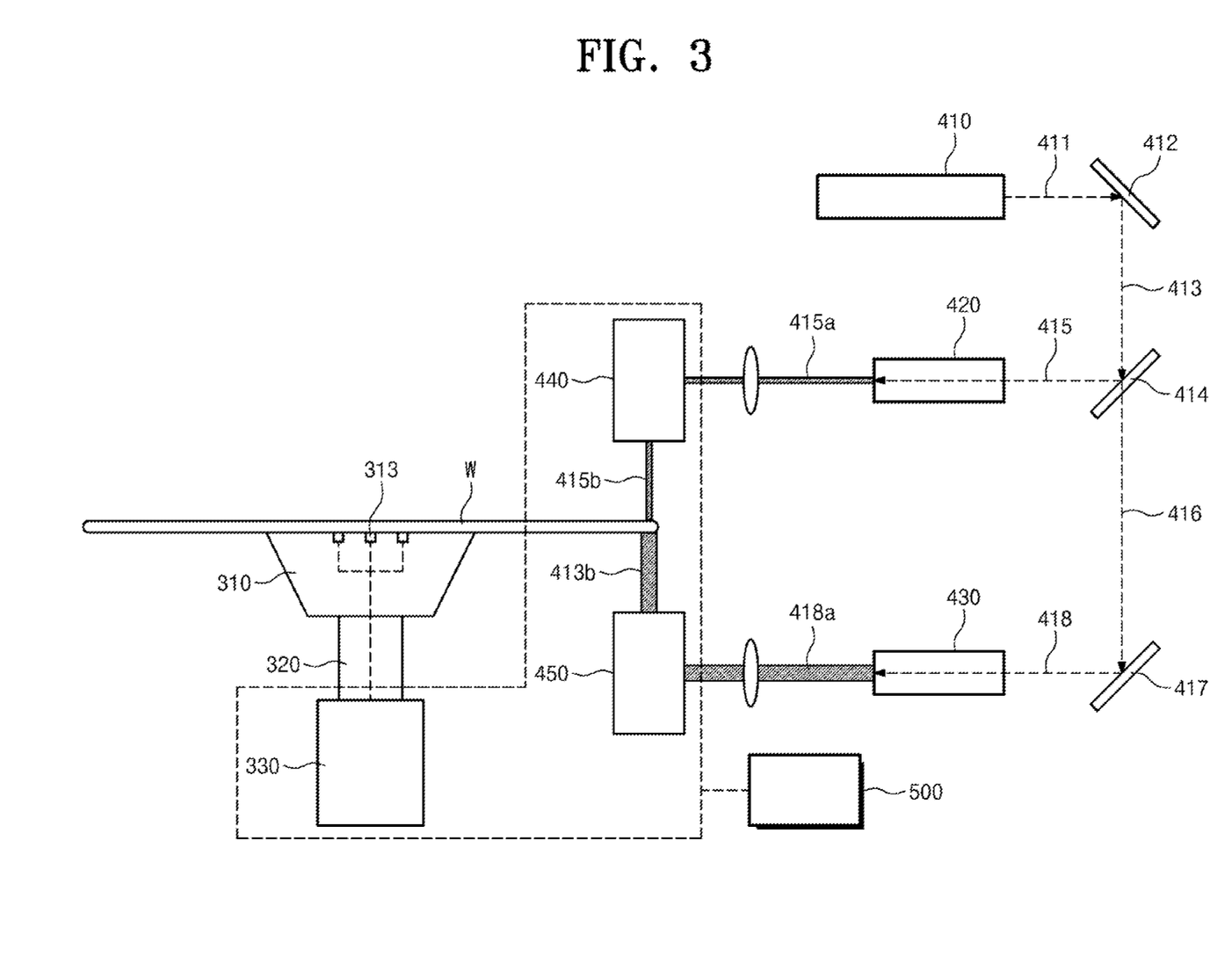
FIG. 3 is a side view of a substrate processing apparatus of FIG. 2.

Hereinafter, the substrate processing apparatus 300 provided in the laser processing chamber 280 will be described in detail. Referring to FIG. 3, the substrate processing apparatus 300 may include a support unit, a laser generation unit 410, a beam splitter 414, a first beam shaping unit 420, a second beam shaping unit 430, a first beam scanning unit 440, a second beam scanning unit 450, and a controller 500.

The substrate processing apparatus 300 may be located in a housing (not illustrated) that has an interior space. The housing has an opening formed on one side thereof, and the opening functions as an entrance through which the substrate W is placed in or extracted from the housing. A door may be provided in the opening to open or close the opening. The housing has, in the bottom thereof, an exhaust hole that is connected with an exhaust line and through which by-products generated during processing of the substrate W in the interior space are released to the outside. Furthermore, a gas supply line for supplying gas into the interior space may be connected to the housing. The gas may be an inert gas such as nitrogen. The gas supplied by the gas supply line may provide a gas flow in the interior space. The gas flow in the interior space enables the by-products generated during processing of the substrate W to be more efficiently released.

The support unit supports and rotates the substrate W. The support unit may include a support plate 310, a rotary shaft 320, and a drive member 330. The support plate 310 supports the substrate W. The support plate 310 has a circular plate shape. An upper surface of the support plate 310 may have a larger diameter than a lower surface of the support plate 310. A side surface of the support plate 310 that connects the upper surface and the lower surface of the support plate 310 may be downwardly inclined toward the central axis of the support plate 310. The upper surface of the support plate 310 serves as a seating surface on which the substrate W is seated. The seating surface has a smaller area than the substrate W. According to an embodiment, the diameter of the seating surface may be smaller than the radius of the substrate W. The seating surface supports a central region of the substrate W. A plurality of suction holes 313 are formed in the seating surface. The suction holes 313 may be holes through which vacuum pressure is applied to the substrate W on the seating surface to clamp the substrate W. A vacuum member (not illustrated) is connected to the suction holes 313. The vacuum member (not illustrated) may be a pump for evacuating the suction holes 313. Without being limited thereto, however, the vacuum member (not illustrated) may include various well-known apparatuses for providing vacuum pressure to the suction holes 313.

The rotary shaft 320 has a cylindrical shape, the lengthwise direction of which is oriented in the vertical direction. The rotary shaft 320 is coupled to the lower surface of the support plate 310. The drive member 330 transmits rotary power to the rotary shaft 320. The rotary shaft 320 is rotatable about the central axis thereof by the rotary power provided from the drive member 330.

The support plate 310 is rotatable together with the rotary shaft 320. The drive member 330 may adjust the rotating speed of the rotary shaft 320 to adjust the rotating speed of the substrate W. For example, the drive member 330 may be a motor. Without being limited thereto, however, the drive member 330 may include various well-known apparatuses for providing rotary power to the rotary shaft 320.

The laser generation unit 410 generates a laser beam 411. The laser generation unit 410 may be a source of the laser beam 411 that is applied to the substrate W. The laser generation unit 410 may apply the laser beam 411 in the manner of a plurality of unit pulse laser beams.

A wavelength adjustment member (not illustrated) is provided on a path of the laser beam 411. The wavelength adjustment member (not illustrated) may change the wavelength of the laser beam 411. For example, the wavelength adjustment member (not illustrated) may be an optical element that changes the wavelength of the laser beam 411. The wavelength adjustment member (not illustrated) may change the wavelength of the laser beam 411 such that a laser L has a wavelength of 150 nm to 1200 nm. When the laser L has a wavelength of 150 nm or less, the substrate W as well as a film on the substrate W is etched, and when the laser L has a wavelength of 1200 nm or more, the film on the substrate W is not removed.

A mirror 412 may reflect the laser beam 411 generated from the laser generation unit 410 and may adjust the beam path. The number and positions of mirrors 412 may be adjusted as needed. The laser beam 411 reflected by the mirror 412 is directed toward the beam splitter 414.

The beam splitter 414 may split the laser beam 411 into a first laser beam 415 travelling along a first path and a second laser beam 418 travelling along a second path. The first path is a path toward an upper edge of the substrate W, and the second path is a path toward a lower edge of the substrate W. A mirror 417 for changing the path of the second laser beam 418 may be provided on the second path. The number and positions of mirrors 417 may be adjusted as needed. The mirror 417 may be provided on the first path as needed.

The first beam shaping unit 420 is provided on the first path to shape the first laser beam 415. The second beam shaping unit 430 is provided on the second path to shape the second laser beam 418.

A first beam shape formed by the first beam shaping unit 420 and a second beam shape formed by the second beam shaping unit 430 differ from each other. According to an embodiment, the first beam shape may be a rectangular shape, and the second beam shape may be a circular shape. According to another embodiment, the first beam shape may be a circular shape, and the second beam shape may be a rectangular shape. According to an embodiment, the first beam shape may be larger in size than the second beam shape. According to another embodiment, the first beam shape may be smaller in size than the second beam shape. According to an exemplary embodiment, the first beam shape has a smaller cross-sectional area than the second beam shape. According to an embodiment, energy per unit area of the first laser beam 415 by the first beam shape may be greater than energy per unit area of the second laser beam 418 by the second beam shape. According to an embodiment, a film etching rate of the first laser beam 415 by the first beam shape may be greater than a film etching rate of the second laser beam 418 by the second beam shape.

A first laser beam 415a shaped by the first beam shaping unit 420 is directed toward the first beam scanning unit 440. A second laser beam 418a shaped by the second beam shaping unit 430 is directed toward the second beam scanning unit 450.

The first beam scanning unit 440 receives the first laser beam 415a and applies a first laser beam 415b to the upper edge of the substrate W in the manner of scanning. The second beam scanning unit 450 receives the second laser beam 418a and applies a second laser beam 418b to the lower edge of the substrate W in the manner of scanning.

The first beam scanning unit 440 may change the direction in which the first laser beam 415a passing through the first beam shaping unit 420 is applied. The first beam scanning unit 440 may include a scanner (not illustrated) inside, and the scanner (not illustrated) may change, along the radial direction of the substrate W, the area where the first laser beam 415b is applied to the substrate W.

The second beam scanning unit 450 may change the direction in which the second laser beam 418a passing through the second beam shaping unit 430 is applied. The second beam scanning unit 450 may include a scanner (not illustrated) inside, and the scanner (not illustrated) may change, along the radial direction of the substrate W, the area where the second laser beam 418b is applied to the substrate W.

The controller 500 may control the first beam scanning unit 440, the second beam scanning unit 450, and the drive member 330. For example, the controller 500 may control scanning speed of the first beam scanning unit 440. For example, the controller 500 may control scanning speed of the second beam scanning unit 450. For example, the controller 500 may adjust the RPM of the drive member 330.

Figure 4:
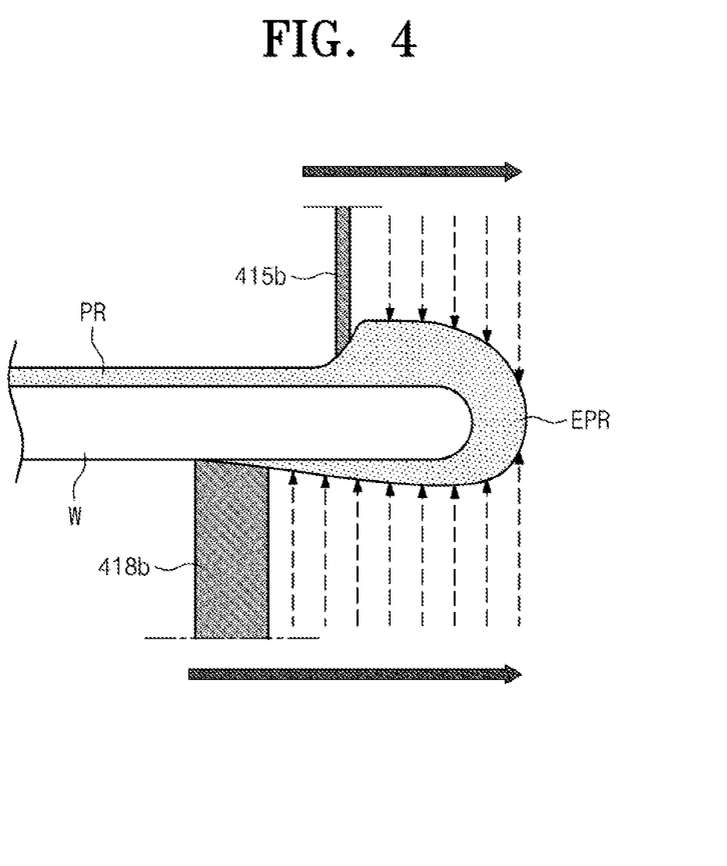
FIG. 4 is a sectional view illustrating an example of applying a first laser beam and a second laser beam to an edge of a substrate having a film thereon in the manner of scanning.
Figure 5:
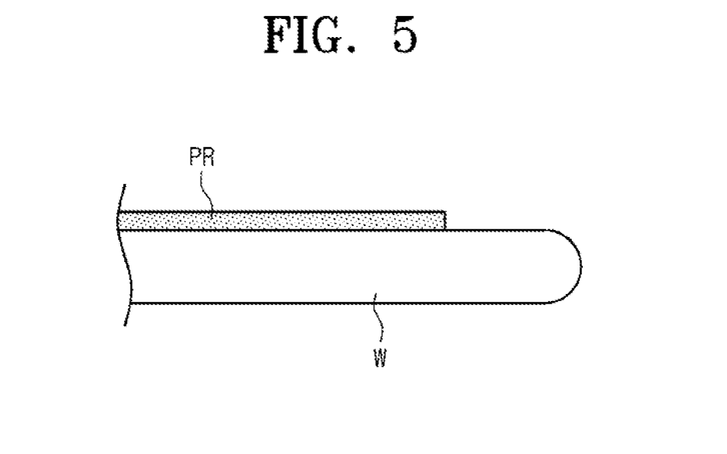
FIG. 5 is a sectional view of the substrate from which the film on the substrate edge is removed.

FIG. 4 is a sectional view illustrating an example of applying a first laser beam and a second laser beam to an edge of a substrate having a film thereon in the manner of scanning, and FIG. 5 is a sectional view of the substrate from which the film on the substrate edge is removed. Referring to FIG. 4, an edge bead (EB) of a film F is formed on the edge of the substrate W. An edge bead (EB) formed on an upper edge of the substrate W forms a thick film, whereas an edge bead (EB) formed on a lower edge of the substrate W forms a thin film. According to an embodiment, the edge bead (EB) formed on the upper edge of the substrate W may have a high adhesion force to the substrate W, whereas the edge bead (EB) formed on the lower edge of the substrate W may have a low adhesion force to the substrate W.

A film etching rate of the first laser beam 415b having the first beam shape may be greater than a film etching rate of the second laser beam 418b having the second beam shape. The first laser beam 415b and the second laser beam 418b may be simultaneously applied to the substrate W and may effectively process the substrate W even when film conditions differ from each other. Furthermore, when film conditions of the upper and lower edges of the substrate W differ from each other, an effective process recipe may be set by making the scanning speed of the first beam scanning unit 440 lower than the scanning speed of the second beam scanning unit 450.

Figure 6:
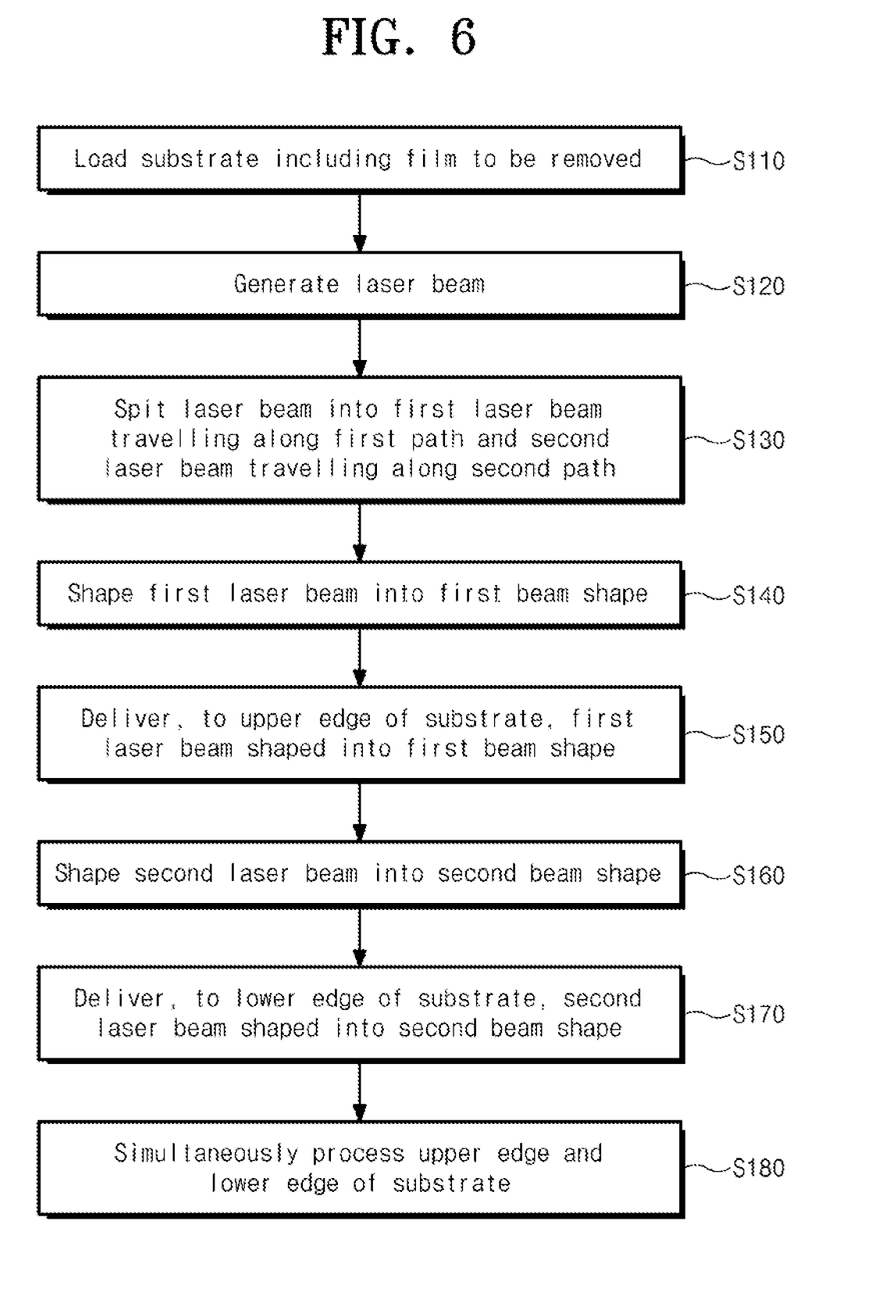
FIG. 6 is a flowchart illustrating a substrate processing method according to an embodiment of the inventive concept.

FIG. 6 is a flowchart illustrating a substrate processing method according to an embodiment of the inventive concept.

In the substrate processing method according to the embodiment, a substrate including a film to be removed is loaded (S110), and the laser generation unit 410 generates the laser beam 411 to process the film to be removed (S120). The beam splitter 414 splits the laser beam 411 into the first laser beam 415 travelling along the first path and the second laser beam 148 travelling along the second path (S130). The first beam shaping unit 420 shapes the first laser beam 415 into the first beam shape 415a (S140), and the shaped first laser beam 415a is delivered to an upper edge of the substrate along the first path (S150). The second beam shaping unit 430 shapes the second laser beam 418 into the second beam shape 418a (S160), and the shaped second laser beam 418a is delivered to a lower edge of the substrate (S170). At this time, the first beam shape of the first beam shape 415a and the second beam shape of the second beam shape 418a differ from each other. Furthermore, the upper edge and the lower edge of the substrate are simultaneously processed (S180).

As described above, according to the embodiments of the inventive concept, the substrate processing apparatus and method may improve substrate processing efficiency.

In addition, according to the embodiments of the inventive concept, the substrate processing apparatus and method may simultaneously and effectively process upper and lower edges of a substrate even when film conditions of the upper and lower edges of the substrate differ from each other.

Effects of the inventive concept are not limited to the above-described effects, and any other effects not mentioned herein may be clearly understood from this specification and the accompanying drawings by those skilled in the art to which the inventive concept pertains.

The above description exemplifies the inventive concept. Furthermore, the above-mentioned contents describe exemplary embodiments of the inventive concept, and the inventive concept may be used in various other combinations, changes, and environments. That is, variations or modifications can be made to the inventive concept without departing from the scope of the inventive concept that is disclosed in the specification, the equivalent scope to the written disclosures, and/or the technical or knowledge range of those skilled in the art. The written embodiments describe the best state for implementing the technical spirit of the inventive concept, and various changes required in specific applications and purposes of the inventive concept can be made. Accordingly, the detailed description of the inventive concept is not intended to restrict the inventive concept in the disclosed embodiment state. In addition, it should be construed that the attached claims include other embodiments.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An apparatus for processing a substrate, the apparatus comprising:
a support unit configured to support the substrate including a film to be removed;
a laser generation unit configured to generate a laser beam to process the film to be removed;
a beam splitter configured to split the laser beam emitted from the laser generation unit and guided to the beam splitter into a first laser beam travelling along a first path toward an upper edge of the substrate and an entirety of a remaining laser beam to a second laser beam travelling along a second path toward a lower edge of the substrate;
a first beam shaping unit provided on the first path and configured to shape the first laser beam;
a second beam shaping unit provided on the second path and configured to shape the second laser beam;
a mirror located outside of the beam splitter in an exit path of the remaining laser beam to change a direction of the remaining laser beam toward the second beam shaping unit;
a first beam scanning unit provided downstream of the first beam shaping unit on the first path and configured to apply the first laser beam that is completely exited from the first beam shaping unit to the upper edge of the substrate in a manner of scanning; and
a second beam scanning unit provided downstream of the second beam shaping unit on the second path and configured to apply the second laser beam that is completely exited from the second beam shaping unit to the lower edge of the substrate in the manner of scanning,
wherein a beam shape of the first laser beam shaped by the first beam shaping unit differs from a beam shape of the second laser beam shaped by the second beam shaping unit.

2. The apparatus of claim 1, wherein a film condition of the upper edge of the substrate differs from a film condition of the lower edge of the substrate.

3. The apparatus of claim 1, wherein the substrate is simultaneously processed by the first laser beam and the second laser beam.

4. The apparatus of claim 1, wherein the second laser beam shaped by the second beam shaping unit has a larger cross-section than the first laser beam shaped by the first beam shaping unit.

5. The apparatus of claim 1, wherein energy per unit area of the first laser beam shaped by the first beam shaping unit is greater than energy per unit area of the second laser beam shaped by the second beam shaping unit.

6. The apparatus of claim 1, wherein a film etching rate of the first laser beam shaped by the first beam shaping unit is greater than a film etching rate of the second laser beam shaped by the second beam shaping unit.

7. The apparatus of claim 1, wherein scanning speed of the first beam scanning unit differs from scanning speed of the second beam scanning unit.

8. The apparatus of claim 1, wherein scanning speed of the first beam scanning unit is lower than scanning speed of the second beam scanning unit.

* * * * *